Oct. 25, 1966  J. J. CRAWFORD  3,281,638

SOLID-STATE BATTERY CHARGER

Filed Nov. 5, 1963

INVENTOR.
JAMES J. CRAWFORD

BY

Karl F. Ross
AGENT.

United States Patent Office 3,281,638
Patented Oct. 25, 1966

3,281,638
SOLID-STATE BATTERY CHARGER
James J. Crawford, Bronx, N.Y., assignor to Yardney
International Corporation, New York, N.Y.
Filed Nov. 5, 1963, Ser. No. 321,457
6 Claims. (Cl. 320—40)

The present invention relates to solid-state voltage-responsive control systems and, more particularly, to battery chargers and the like in which the electrical potential across a load (e.g. a battery) is sensed and the power from a source connected thereto cut off upon the attainment of a predetermined level of the load potential.

Heretofore battery chargers and other voltage-responsive control systems have principally made use of electromechanical devices to terminate the flow of charging current to the battery or to reduce this current flow. These electromechanical devices, primarily relays, thermal switches and similar electromagnetic or thermoelectric elements, were not suitable for use in control modules to be subjected to shock, rapid and large changes in temperature and other environmental hazards. The relatively large number of failures in electromechanical systems has led the industry to turn to electronic control means as replacements for the electromechanical elements. For the most part, these electronic control devices have compressed electronic switching elements of the continuous or breakdown type (e.g. triodes, transistors, thyratrons) in circuit with the load and the source of charging current and sensing means responsive to the potential across the load for triggering the switch element. It has been proposed, for example, to provide a solid-state controlled rectifier in series with the battery and to have the gate circuit of the latter provided with an amplifier device responsive to the potential across the load. In an alternative arrangement, a unijunction transistor was connected across the load to operate or inactivate a transistor switch upon the battery voltage falling below a predetermined minimum level and rising above a predetermined maximum level, respectively. With such systems, however, it has been found difficult, in practice, to obtain sharp voltage cut-off levels, responses which will not vary materially with temperature, and high-charging capacities.

It is a principal object of the present invention to provide a solid-state voltage-responsive control system particularly adapted to precise cut-off of the current supplied to a load upon an increase in the potential thereacross.

Another object of this invention is to provide an improved system of the character described for use in charging batteries and having a high resistance to shock and temperature variations.

Still another object of this invention is to provide a control system for battery chargers and the like which is automatically reset upon disconnection and reapplication of the line voltage.

A further, more specific object of this invention is to provide a control system of the character described which is able to distinguish between momentary or transient increases in the sensed potential and prolonged variations therein.

These and other objects of this invention, which will become apparent hereinafter, are attained in accordance with the present invention by providing a control system interposed between a load, adapted to develop a variable potential thereacross, and a source of current for this load, the control system comprising essentially a first breakdown device connected in circuit with the load and the source and having a control element triggered in cadence with the pulsating current of the source to pass this current to the load, voltage-responsive means being provided to block or eliminate the control pulses upon the voltage across said load attaining a predetermined magnitude.

According to a more specific feature of this invention, precise control of the point at which the control pulses are blocked is obtained by connecting a further breakdown device to the control element of the first-mentioned breakdown device, the second breakdown device being rendered conductive to return the control pulses to ground and thus block them. It will be readily apparent, therefore, that the electronic switch element, namely the first breakdown device, in circuit with the load and the source is triggered from an "on" to an "off" condition only upon the precipitous operation of the second breakdown element. Thus it is possible to eliminate the effects of minor variations in the biasing resistances of conventional electronic switches (e.g. transistors) resulting from changes in temperature and to render the primary electronic switch substantially independent of such temperature fluctuations.

The voltage-responsive sensing means of the instant invention can include a unijunction transistor whose emitter is connected to a voltage-divider network (e.g. a potentiometer) and is supplied with a reference potential via a solid-state voltage regulator, such as a Zener diode. In this case, both of the aforementioned breakdown devices can be solid-state controlled rectifiers so that all of the basic electronic elements are in the form of solid-state elements, the entire control system being potted or formed as an independent module connectable in any battery-charging circuit, in a meter circuit or as a replacement for a voltage-responsive relay. According to a more particular feature of this invention, a time-constant network is inserted in the voltage-sensing means, preferably between the potentiometer and the emitter of the unijunction transistor. The potentiometer may, of course, constitute one element of such a network. This time-constant network in effect prevents premature cut-off of the supply current by energization of the first controlled rectifier during transient voltages above the predetermined maximum, such transients being common during the early stages of battery charging, especially when alkaline cells are employed, the time-constant network results in a dissipation and/or delay of the transient overvoltage.

The above and other objects, features and advantages of the present invention will become more readily apparent from the following description, reference being made to the accompanying drawing in which.

Figure 1:
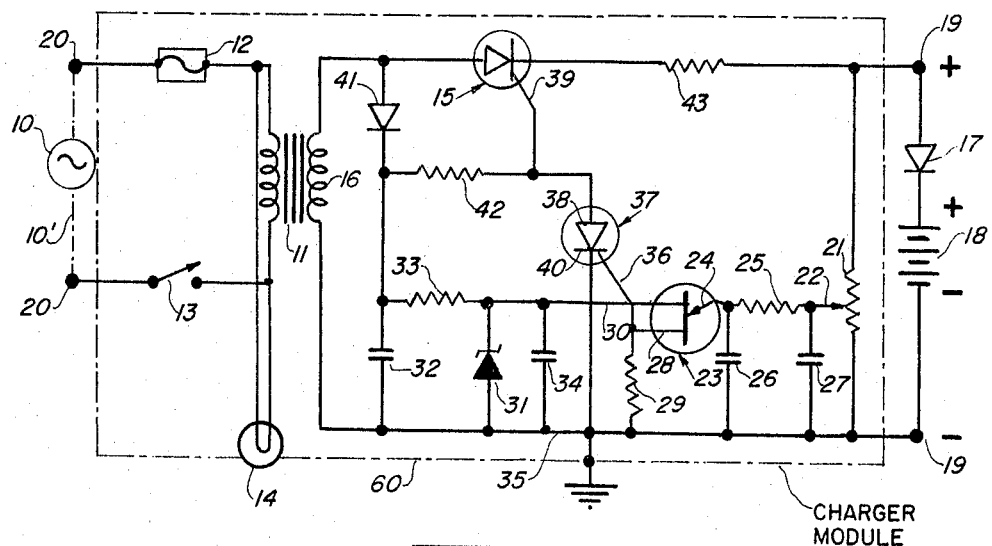
FIG. 1 is a circuit diagram of a battery charger embodying the invention.

In FIG. 1 I show a battery charger comprising an alternating-current source 10, which may be representative of a conventional power line to which a transformer 11 is connected via a fuse 12 and a switch 13. A pilot lamp 14 can also be connected across the primary winding of this transformer. The control system of the battery charger comprises a solid-state controlled rectifier 15 in series with the secondary winding 16 of the transformer, a cathode-limiting resistor 43 and a rectifier 17 (e.g. a solid-state diode) across battery 18. The entire charger can be potted or mounted upon a single printed-circuit board so that its output terminals 19 can be connected across the battery 18 and its input terminals 20 in circuit with the line 10'. The voltage-sensing means of the control system includes a potentiometer 21 connected across the output terminals 19 and having a manually shiftable wiper 22 in the emitter circuit of a unijunction transistor 23. Potentiometer 21 thus constitutes a voltage divider connected across the battery 18. The emitter 24 of unijunction transistor 23 is connected to the wiper 22 via a resistor 25 forming a time-constant network with a capacitor 26. Another capacitor 27 in circuit with resistor 25 and potentiometer 21 likewise forms a time-constant network therewith, delaying the application of voltage pulses to the emitter 24 of the unijunction transistor or dissipating such pulses. The first base 28 of the latter is connected to the negative side of the control system via a biasing resistor 29 whereas the second base 30 is supplied with a stable direct-current reference voltage via a solid-state voltage-limiting element such as a Zener diode 31, the latter breaking down in a conventional manner upon the potential across capacitor 32 exceeding a predetermined level. A resistor 33 in circuit with the Zener diode 31 and capacitor 32 permits discharge of excessive potentials developing across the capacitor. A smoothing condenser 34 is bridged between the negative bus bar 35 and the second base 30 of unijunction transistor 23.

Base 28 of the unijunction transistor is tied to the gate 36 of a solid-state controlled rectifier 37 which functions as a triggering device to terminate the gating pulse applied to controlled rectifier 15 and, consequently, to render the latter nonconductive at a substantially invariable point, with respect to environmental conditions, determined by the setting of potentiometer 21. The anode 38 of controlled rectifier 37 is thus connected directly to the gate 39 of controlled rectifier 15 while the cathode 40 is supplied with a negative potential from bus bar 35. The gating pulses for controlled rectifier 15 are derived from a solid-state rectifying diode 41 in series with a resistor 42 across the anode/gate electrodes of controlled rectifier 15.

During each positive half cycle of the alternating current supplied by transformer 11, a positive pulse is supplied to the gate 39 of controlled rectifier 15 via diode 41 and resistor 42, thereby rendering the controlled rectifier 15 conductive so that half-wave, pulsating direct current is supplied by the latter to the battery 18 via diode 17. During normal charging of the battery, controlled rectifier 37 is nonconductive as a consequence of the negative bias upon its gate 36. With successive pulses of the raw rectified current supplied to battery 18, during the initial portion of the charging operation there may be a transient increase of the potential across potentiometer 21, this transient being dissipated by the time-constant networks 21 and 25–27 which prevent the emitter 24 from becoming relatively more positive during these transient pulses. Such transients are generally present in silver/zinc and silver/cadmium batteries employing alkaline electrolytes.

The reference potential is supplied to the unijunction transistor through rectifying diode 41 and capacitor 32, the Zener diode 31 stabilizing this reference potential which does not vary significantly in spite of the fact that pulsating direct current is employed. When the battery 18 comes up to its predetermined maximum voltage (determined by the adjustment of potentiometer 21) emitter 24 of the unijunction transistor 23 is rendered more positive and converts the potential at gate 36 to a positive one relative to the cathode. Controlled rectifier 37 is thus rendered conductive to effectively block the gating pulses supplied to controlled rectifier 15 by passing them to ground (i.e. the negative bus bar 35) or to another relatively negative portion of the circuit. Upon termination of the gating pulses the conductive state of controlled rectifier 15 is quenched with the next reduction of the potential at the anode of this controlled rectifier to zero or a level below the battery potential. Once the unijunction transistor 23 has been operated, controlled rectifier 15 will remain nonconductive until the device is reset. Since the gating pulses for the controlled rectifier derive from the line and/or in the cadence of the pulsating source, disconnection and reconnection of the line will result in an automatic resetting of the device and permit immediate charging. The unijunction transistor 23 provides a relatively sharp gating pulse to the controlled rectifier 37 and thus constitutes a trigger element therefor.

Figure 2:
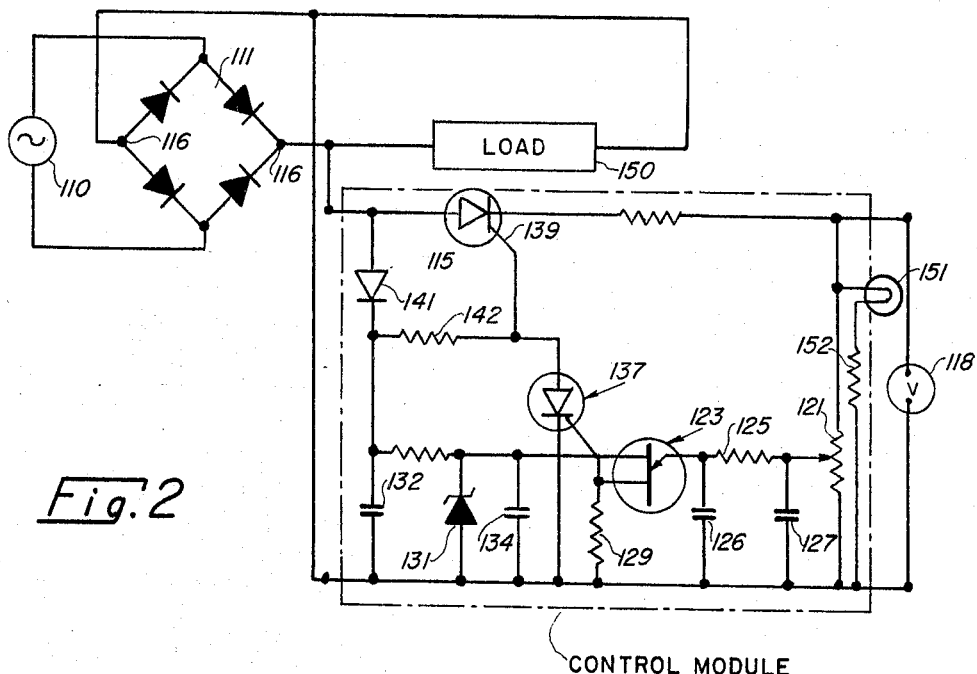
FIG. 2 shows a control-system module of the present invention as a meter-protection device.

In FIG. 2 I show how the control circuit may be employed as a protective device for a meter 118 connected across a load 150. In this case, a full-wave rectifier 111 has its input terminals energized by an alternating current source 110 and its output terminals 116 connected across this load to provide a pulsating full wave rectified current to the latter. Again the control circuit comprises a voltage-sensing element 121 which feeds the unijunction transistor 123 via the time-constant networks composed of resistor 125 and capacitors 126 and 127 in combination with potentiometer 121. The unijunction transistor serves to operate a controlled rectifier 137 and is provided with a Zener diode 131 which applies to the unijunction transistor the reference potential. The full-wave pulses across the load 150 are passed to the meter 118 by the controlled rectifier 115 in the cadence determined by the application of these pulses to the gate 139 of the latter via diode 141 and resistor 142. When an excessive potential develops across load 150, the gating pulses are blocked by draining them to the negative side of the control system via controlled rectifier 137 as previously described. When the pulse amplitude reverts to zero, controlled rectifier 115 is quenched to prevent damage to the meter. In both of the embodiments illustrated, it is necessary to ensure that the driving potential for the controlled rectifier be zero or reversed when the latter is to be quenched. When the battery is connected in the circuit, it applies a reversing potential between the anode and the cathode of the controlled rectifier upon a decrease in the supplied voltage below the battery potential. A pilot lamp 151 can also be provided in the output circuit of the control system (in series with a low-current-drain resistor 152) to provide a visual indication as to whether the control device 15, 115 is in a conductive or a nonconductive state. It has been found to be desirable to form all of the solid-state components, resistors, capacitors and the potentiometer as a single potted module (shown at 60 in FIG. 1) suitable for use as an electronic voltage-responsive overload device having general application.

When the circuit illustrated in FIG. 1 was used to charge six silver/cadmium alkaline cells in series and with a charging current of 0.5 amp., a cutoff voltage of 9.4 volts was obtained at room temperature; 9.2 volts at about 50° C. and 9.3 volts at 0° C. The fluctuation through this temperature range was thus a maximum of 2%. Merely by changing the current capacity of controlled rectifier 15 it is possible to use the same circuit for currents ranging from fractions of an ampere to hundreds of amperes at low or high voltages.

The invention as described and illustrated is believed to admit of many modifications and variations within the ability of persons skilled in the art, all such modifications and variations being deemed included within the spirit and scope of the appended claims.

What is claimed is:

1. A voltage-responsive control system interposable between a source of pulsating current and a load operable thereby, comprising a first triggerable breakdown device in circuit with said load and said source and having a control element energizable by the latter with triggering pulses in the cadence of the supply pulses of said source to render said first breakdown device conductive during each supply pulse of a predetermined polarity; a solid-state controlled rectifier having its anode and cathode in circuit with said control element and a gate triggerable for blocking the supply of triggering pulses to the latter; voltage-responsive sensing means connected across said load and including a unijunction transistor connected with said gate operable upon the potential across said load attaining a predetermined magnitude for triggering said controlled rectifier; and a time-constant network in circuit with said unijunction transistor for dissipating transient increases in said potential detected by said sensing means, thereby preventing the triggering of said controlled rectifier during detection of said transient increases.

2. A voltage-responsive control system interposable between a source of pulsating current having two terminals and a load operable thereby, comprising a first solid-state controlled rectifier having its anode and cathode in circuit with said load and one terminal of said source and having a gate energizable by the latter with triggering pulses in the cadence of the supply pulses of said source to render said first controlled rectifier conductive during each supply pulse of a predetermined polarity; a second solid-state controlled rectifier having its anode and cathode in circuit with said gate and the other terminal of said source, and a gate triggerable for blocking the supply of triggering pulses to the latter; and voltage-responsive sensing means connected across said load and including a unijunction transistor connected with said gate of said second controlled rectifier operable upon the potential across said load attaining a predetermined magnitude for triggering said second controlled rectifier.

3. A battery charger comprising a source of pulsating charging current connectable across a battery and having two terminals; and a voltage-responsive solid-state control system interposed between said source and said battery for cutting off the supply of said current to said battery, said system comprising a first solid-state controlled rectifier having its anode and cathode in circuit with said battery and one terminal of said source, and having a gate energizable by the latter with triggering pulses in the cadence of the supply pulses of said source to render said first controlled rectifier conductive during each supply pulse of a predetermined polarity; a second solid-state controlled rectifier having its anode and cathode in circuit with said gate and triggerable with the other of said terminals, and a gate for blocking the supply of triggering pulses to the latter; voltage-responsive sensing means including a unijunction transistor connected across said battery and connected with said gate of said second controlled rectifier while being operable upon the potential across said battery attaining a predetermined magnitude for triggering said gate of said second controlled rectifier; and a time-constant network in circuit with said sensing means for dissipating transient increases in said potential detected by said sensing means, thereby preventing the triggering of said second controlled rectifier, during detection of said transient increases.

4. A battery charger as defined in claim 3 wherein said voltage-responsive sensing means includes a voltage-divider connected across said battery for energizing the emitter of said unijunction transistor, said time-constant network being interposed between said emitter and said voltage-divider.

5. A battery charger as defined in claim 4, further comprising a triggering circuit for said gate of said first controlled rectifier connected to said source, said triggering circuit including rectifier means for applying to said gate current pulses of said source of a pre-determined polarity, and means including a Zener diode supplying a substantially constant reference voltage to said unijunction transistor.

6. A battery charger as defined in claim 5, further comprising a capacitor connected across said Zener diode and chargeable through said rectifier means for supplying said reference voltage to said unijunction transistor.

References Cited by the Examiner
UNITED STATES PATENTS

| | | | |
|---|---|---|---|
| 3,009,091 | 11/1961 | Hallidy | 322—28 |
| 3,160,805 | 12/1964 | Lawson | 320—39 |
| 3,195,029 | 7/1965 | Gilbreath | 323—22 X |

JOHN F. COUCH, *Primary Examiner.*

S. WEINBERG, *Assistant Examiner.*